United States Patent
Wang et al.

(10) Patent No.: US 10,359,621 B2
(45) Date of Patent: Jul. 23, 2019

(54) FROST-PREVENTION FILM SYSTEM OF LARGE-APERTURE REFLECTING OPTIC INFRARED TELESCOPE USED IN EXTREMELY LOW TEMPERATURE ENVIRONMENT AND PREPARATION METHOD THEREOF

(71) Applicant: NANJING INSTITUTE OF ASTRONOMICAL OPTICS & TECHNOLOGY, NATIONAL ASTORNOMICAL OBSERVATORIES, CHINESE ACADEMY OF SCIENCES, Nanjing, Jiangsu (CN)

(72) Inventors: Jinfeng Wang, Jiangsu (CN); Yeru Wang, Jiangsu (CN); Jie Tian, Jiangsu (CN); Xinnan Li, Jiangsu (CN)

(73) Assignee: NANJING INST OF ASTRONOMICAL OPTICS & TECH NAT ASTRONOMICAL OBSERVATORIES CHINESE ACAD OF SCIENCE, Nanjing, Jiangsu (CN)

( * ) Notice: Subject to any disclaimer, the term of this patent is extended or adjusted under 35 U.S.C. 154(b) by 93 days.

(21) Appl. No.: 15/572,320

(22) PCT Filed: Apr. 29, 2016

(86) PCT No.: PCT/CN2016/080743
§ 371 (c)(1),
(2) Date: Nov. 7, 2017

(87) PCT Pub. No.: WO2016/202107
PCT Pub. Date: Dec. 22, 2016

(65) Prior Publication Data
US 2018/0149856 A1    May 31, 2018

(30) Foreign Application Priority Data
Jun. 18, 2015  (CN) .......................... 2015 1 0340393

(51) Int. Cl.
*G02B 23/00* (2006.01)
*G02B 23/24* (2006.01)
(Continued)

(52) U.S. Cl.
CPC ........... *G02B 23/2492* (2013.01); *G02B 1/14* (2015.01); *G02B 1/18* (2015.01); *G02B 5/0858* (2013.01);
(Continued)

(58) Field of Classification Search
CPC ........ G02B 1/14; G02B 5/0858; G02B 5/208; G02B 7/008; G02B 7/183; G02B 23/06; G02B 23/2492
(Continued)

(56) References Cited

U.S. PATENT DOCUMENTS 3,686,473 A * 8/1972 Shirn .................... B60R 1/0602
219/202
4,131,795 A   12/1978 Takenouchi
(Continued)

FOREIGN PATENT DOCUMENTS

CN    1119742      4/1996
CN    102808153    12/2012
(Continued)

OTHER PUBLICATIONS

International Search Report filed in PCT/CN2016/080743 dated Jul. 12, 2016.

*Primary Examiner* — Ricky D Shafer
(74) *Attorney, Agent, or Firm* — Rankin, Hill & Clark LLP

(57) ABSTRACT

A frost-prevention film system of a large-aperture reflecting optic infrared telescope used in an extremely low temperature environment and a preparation method thereof is disclosed. The frost-prevention film system has the following
(Continued)

structure: a transparent conducting film layer, an intermediate insulation layer, a reflecting film layer and an outermost medium protection layer in sequence from a main telescope mirror surface, wherein both sides of the transparent conducting film layer are provided with conducting electrodes. The steps are as follows: (1) a preparation step; (2) a step of plating a conducting film; (3) a step of plating an intermediate insulation layer; (4) a step of plating a reflecting film layer; (5) a step of plating an outermost medium protection layer; and (6) a step of plating conducting electrodes.

6 Claims, 3 Drawing Sheets

(51) Int. Cl.
*G02B 5/20* (2006.01)
*G02B 5/08* (2006.01)
*G02B 1/18* (2015.01)
*G02B 1/14* (2015.01)
*G02B 7/00* (2006.01)
*G02B 23/06* (2006.01)
*G02B 7/183* (2006.01)

(52) U.S. Cl.
CPC .............. *G02B 5/208* (2013.01); *G02B 7/008* (2013.01); *G02B 23/06* (2013.01); *G02B 7/183* (2013.01)

(58) Field of Classification Search
USPC ................................ 359/360, 512, 883, 900
See application file for complete search history.

(56) References Cited

U.S. PATENT DOCUMENTS

| | | | | |
|---|---|---|---|---|
| 4,710,426 | A | * | 12/1987 | Stephens ................. C03C 17/38 359/360 |
| 5,594,585 | A | * | 1/1997 | Komatsu ................... B60R 1/06 219/202 |
| 6,994,444 | B2 | * | 2/2006 | del Puerto ........... G02B 5/0891 359/350 |

FOREIGN PATENT DOCUMENTS

| | | |
|---|---|---|
| CN | 204044388 | 12/2014 |
| CN | 104570166 | 4/2015 |
| CN | 104991294 | 10/2015 |
| JP | 1096846 | 4/1998 |

* cited by examiner

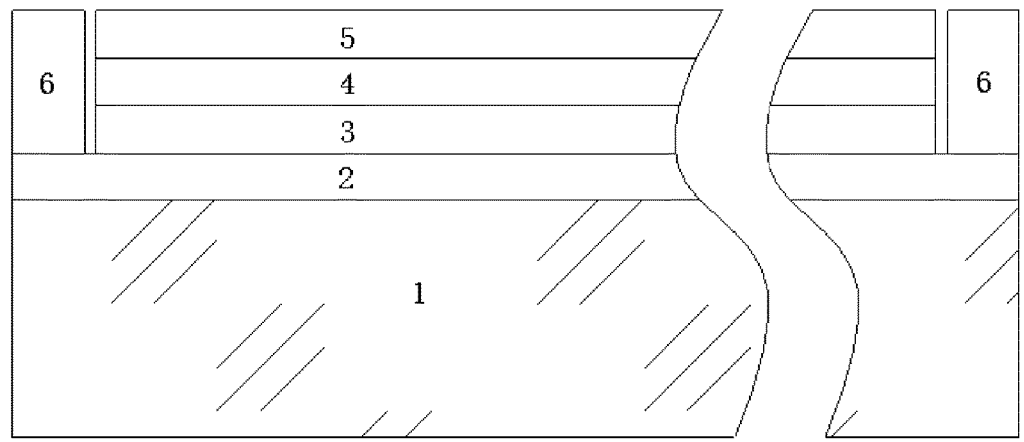
Fig. 1-(a)
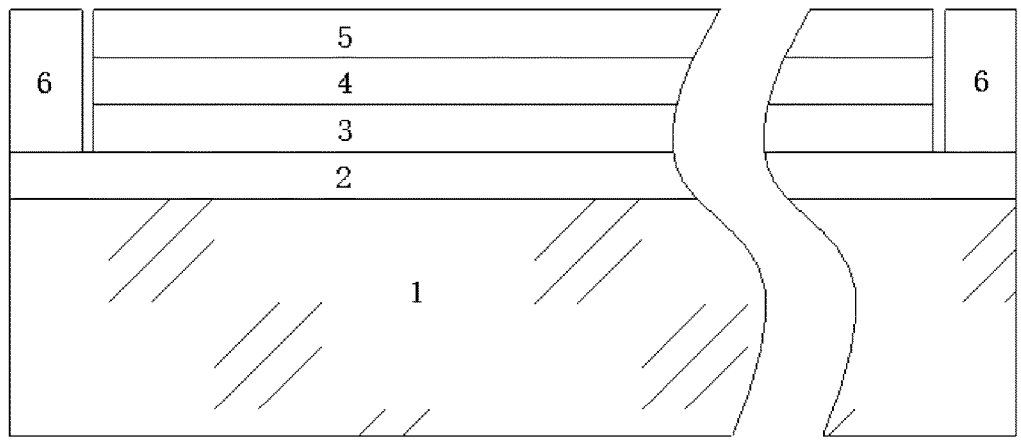
Fig. 1-b

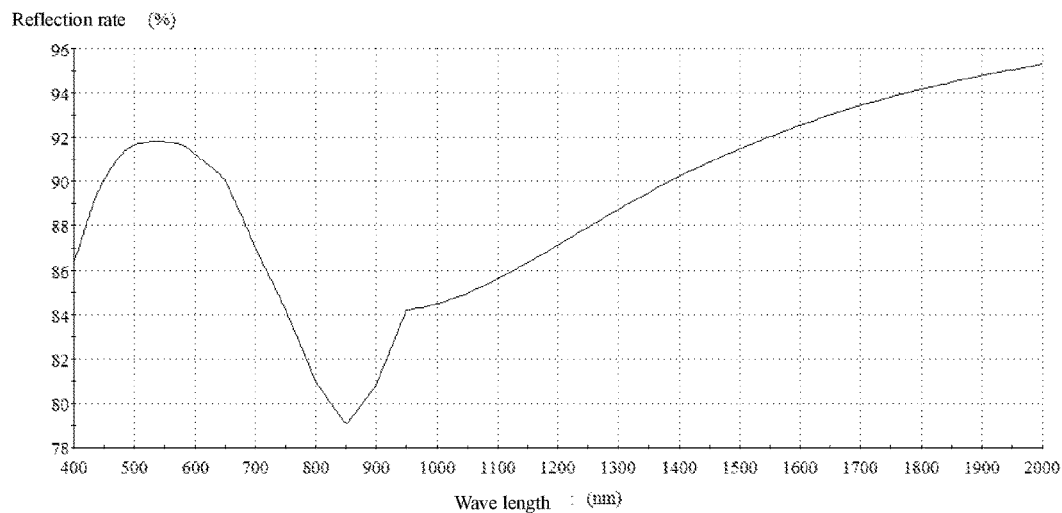
Fig. 2-(a)
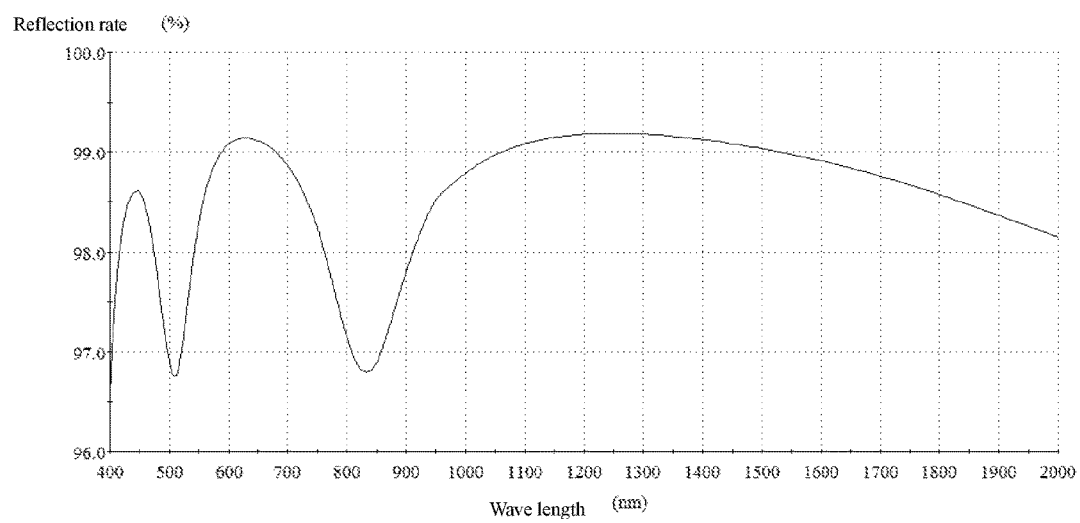
Fig. 2-b

— Spectral reflection curve of conducting film on ordinary reflector
- - - Spectral reflection curve of frost-prevention reflecting film system

FROST-PREVENTION FILM SYSTEM OF LARGE-APERTURE REFLECTING OPTIC INFRARED TELESCOPE USED IN EXTREMELY LOW TEMPERATURE ENVIRONMENT AND PREPARATION METHOD THEREOF

TECHNICAL FIELD

The present invention relates to the technical field of processing optic filming, and more particularly, to a frost-prevention film system of a large-aperture reflecting optic infrared telescope used in an extremely low temperature environment (antarctic region) and a preparation method thereof.

BACKGROUND

A reflecting optic telescope is widely applied in an astronomical telescope. Since the reflecting optic system does not have special requirement on the optic property of glass materials, and the light does not need to penetrate through the materials, light weight processing may be conducted on the main telescope to reduce the weight without a chromatic aberration; moreover, an optic material of the large-aperture lens is rare, and is expensive. Therefore, a reflecting structure design is usually used in the large-aperture telescope. The light path of the large-aperture reflecting telescope is generally in an open structure. When the large-aperture reflecting telescope is used in an extremely low temperature environment, a phenomenon of frosting on the telescope mirror surface may occur, which leads to the failure of normal observation.

A transparent conducting film layer (ITO) is widely used in an LCD, a touch screen and a solar energy element. The transparent conducting film is a heavy-doped n-type semiconductor with high degeneracy, and has lower specific resistance which is about $10^{-4}$ Ω·cm, and a forbidden bandwidth is between 3.5 eV and 4.5 eV. Therefore, the absorption in a visible region is very little, and the average penetration rate after plating may reach to more than 85%. The transparency and the electrical conductivity of a substance are preferably unified by the electric conductivity close to metal and the high penetration rate in the visible light scope of the transparent conducting film layer.

The transparent conducting film is widely used in a solar cell, a display, a gas sensitive element, an antistatic coating, windows of modern warplanes and cruise missiles, an infrared radiation reflector coating, gloss defrosting used in planes and trains, wall glass of buildings and other aspects by the electric conductivity close to metal, the high penetration rate and the high infrared reflecting rate in the visible light scope, and the semiconductor property thereof.

The existing optic reflecting reflectors in the optic plating technology include a metal reflector and an all-dielectric reflector. The most common metal materials used in the metal reflector comprise aluminum (AL), argentum (Ag), gold (Au), etc. A single layer or multi-layer dielectric film is provided on the reflecting film, which protects the metal film and increases the reflection of a specific band. The all-dielectric reflector is composed of dielectric film pack materials with alternatively high and low refractive indexes. When an ordinary metal reflector or an all-dielectric reflector is used in the optic telescope with the large-aperture reflecting open structure, the difficulty of failure on observation caused by frosting on the telescope mirror surface may occur under the antarctic environment with an extremely low temperature.

At present, all the antarctic astronomical telescopes are designed with a small-aperture penetration-type sealed structure, and a window sealing glass plated with a transparent conducting film is used in the front surface of the telescope to achieve the frost-prevention function of the telescope. The transparent area of the transparent conducting film is in a visible light and near-infrared band, while strong absorption appears in an infrared band. Therefore, this structure design is not suitable for a large-aperture reflecting optic infrared telescope, as shown in FIG. 3.

SUMMARY

The problem to be solved by the present invention is to provide an optic reflecting film with a frost-prevention function regarding the frosting on the telescope mirror surface of a large-aperture reflecting optic infrared telescope with an open structure is used in an extremely low temperature environment or in an antarctic region.

In order to solve the problem above, the technical solution used by the present invention is as follows: the present invention discloses a frost-prevention film system of a large-aperture reflecting telescope used in an extremely low temperature environment and a preparation method thereof, wherein a transparent conducting film is integrated on a reflecting film system of the reflecting optic telescope, and the structure of the transparent conducting film is as follows: a transparent conducting film layer, an intermediate insulation layer, a reflecting film layer and an outermost medium protection layer in sequence from a reflector surface; and both sides of the transparent conducting film layer are provided with conducting electrodes.

Wherein, indium tin oxide is used in the transparent conducting film layer, and the thickness of the film layer is 180 nm;

silicon dioxide is used in the intermediate insulation layer, and the thickness of the film layer is 200 nm;

aluminum or argentum is used in the reflecting film layer, and the thickness of the film layer is 100 nm; and silicon dioxide, tantalum pentoxide and other dielectric oxides are used in the outermost medium protection layer, the film layer structure is a single layer of oxide materials or is composed of dielectric oxide materials with alternatively high and low refractive indexes, which plays a role of protecting the metal film and increasing the reflection of a specific band.

The conducting electrodes are made of copper, and the thickness of the film layer of the conducting electrode is 300 nm.

The technical solution to finish the second object of the application is a preparation method of the frost-prevention film system of a large-aperture reflecting optic infrared telescope used in an extremely low temperature environment, comprising the following steps of:

(1) a preparation step;
(1)-1. cleaning all related parts in a vacuum chamber;
(1)-2. adding related film materials;
(1)-3. placing in an optic reflecting lens to be plated; and
(1)-4. vacuumizing the vacuum chamber;
(2) a step of plating a conducting film: evaporating the conducting film materials after baking, wherein the technological conditions are that: the conducting film material is indium tin oxide and the monitoring thickness of the film layer is 180 nm;

(3) a step of plating an intermediate insulation layer: wherein the plating material of the intermediate insulation layer is silicon dioxide, and the monitoring thickness of the film layer is 200 nm;

(4) a step of plating a reflecting film: wherein the plating material of the reflecting film is aluminum or argentum, and the monitoring thickness of the film layer is 100 nm;

(5) a step of plating the outermost medium protection layer: wherein the plating material of the outermost medium protection layer is silicon dioxide, or silicon dioxide and tantalum pentoxide, and the outermost medium protection layer is a single layer or is collocated by film layers with high and low refractive indexes; Preferably, when the plating material of the reflecting film is aluminum film, the plating material of the outermost medium protection layer is silicon dioxide; and when the plating material of the reflecting film is argenteum film, the plating material of the outermost medium protection layer is silicon dioxide and tantalum pentoxide.

(6) a step of plating the conducting electrodes: wherein the conducting electrodes are made of copper, and the monitoring thickness of the film layer is 300 nm.

More specifically and more preferably, the operation method of each step is as follows:

the adding related to film materials in step (1)-2 in the preparation step refers to respectively adding indium tin oxide, silicon dioxide, tantalum pentoxide, aluminum or argentum, and copper film materials into a crucible;

the vacuum degree of vacuumizing the vacuum chamber in the step (1)-4 is superior to $6\times10^{-4}$ Pa; and the technical conditions of other steps are respectively as follows:

(2) the step of plating the conducting film: after keeping constant under the baking temperature of 180° C. for 3 h, evaporating the conducting film material, wherein the technical condition is that: the conducting film material is indium tin oxide (the mass ratio is 90% $In_2O_3$ and 10% $Sn O_2$), the vacuum degree is superior to $6\times10^{-4}$ Pa, 40 SCCM oxygen is inflated in a Hall ion source, the anode voltage of the ion source is 180V, and the anode current is 6 A;

(3) the step of plating intermediate insulation layer plating step: the plating material of the intermediate insulation layer is silicon dioxide, the vacuum degree is superior to $6\times10^{-4}$ Pa, 40 SCCM oxygen is inflated in the Hall ion source, the anode voltage of the ion source is 180V, and the anode current is 6 A;

(4) the step of plating the reflecting film: the plating material of the reflecting film is aluminum or argentum, the vacuum degree is superior to $6\times10^{-4}$ Pa, and the evaporation speed rate is larger than 10 nm/s;

(5) the step of plating an outermost medium protection layer: wherein the material of the outermost medium protection layer is silicon dioxide, tantalum pentoxide and other oxide film materials, the vacuum degree is superior to $6\times10^{-4}$ Pa, 40 SCCM oxygen is inflated in the Hall ion source, the anode voltage of the ion source is 180V, and the anode current is 6 A; and (6) a step of plating conducting electrodes: wherein the conducting electrodes are made of copper, and the vacuum degree is superior to $6\times10^{-4}$ Pa.

In other words, the technical method of the frost-prevention reflecting film according to the present invention comprises the preparation steps of cleaning all the related parts in the vacuum chamber, adding the related film materials and placing the materials in the optic reflecting lens to be plated; the vacuumizing step of vacuuming the vacuum chamber; and the film plating step of vaporizing and depositing the related film materials on the surface of the optic reflecting lens after the vacuum degree reaches the requirements. The step of plating films comprises the following sub-steps: the step of plating the conducting film; the step of plating the intermediate insulation layer and the reflecting film; and the step of plating the conducting electrodes.

Compared with the prior art, the present invention has the following beneficial effects since the solution above is used.

1. The frost-prevention reflector prepared according to the present invention can be used in the extremely low temperature environment and in the antarctic region, and can be combined with the telescope mirror surface temperature rise to control and avoid the frosting of the telescope surface.

2. The structure of the frost-prevention reflecting film system is rationally designed, thereby guaranteeing the spectral reflection performance of the reflector in the visible and infrared band while having the function of frost-prevention.

When the aluminum film is used as the reflecting material of the film layer, in the band scope ranging from 400 nm to 2000 nm, the average value of the spectral reflection rate of the frost-prevention reflecting film system is superior to 89%; which is equal to the spectral reflection performance of the aluminum reflector that is not integrated with an ITO film layer; while the spectral reflection rate of an ordinary reflector of the ITO film layer on the outmost layer is only 60%.

BRIEF DESCRIPTION OF THE DRAWINGS

FIG. 1-a is a structure diagram of a frost-prevention reflecting film system in embodiment 1;

FIG. 1-b is a structure diagram of a frost-prevention reflecting film system in embodiment 2;

FIG. 2-a is spectral reflection curve of a frost-prevention aluminum reflector;

FIG. 2-b is spectral reflection curve of a frost-prevention Ag reflecting film system;

DETAILED DESCRIPTION

Figure 3:
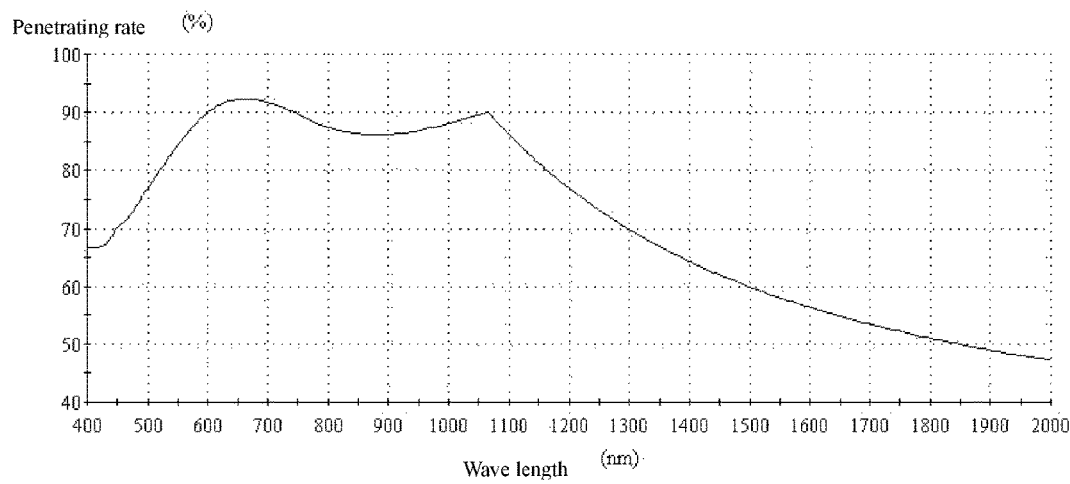
FIG. 3 is a transmitted spectrum curve of a transparent conducting film.

The present invention provides a reflecting film system of a reflecting optic telescope which is integrated with a transparent conducting film. The structure of the transparent conducting film is as follows: a transparent conducting film layer, an intermediate insulation layer, a reflecting film layer and an outermost medium protection layer in sequence from a reflector surface; and both sides of the transparent conducting film layer are provided with conducting electrodes.

The present invention is described in details hereinafter through specific embodiments.

Embodiment 1

In the embodiment, the structure of a frost-prevention reflecting film system is rationally designed according to the spectral characteristic of a transparent conducting film (ITO) and in the combination of the working band of a 2.5 m telescope in the Antarctic, thereby guaranteeing the spectral reflection performance of the film system while having the function of frost-prevention. The plating process of the frost-prevention reflecting film system comprises: plating a conducting film, plating an insulation layer and a reflecting film system, and plating electrodes. An optic reflecting film system with the frost-prevention function is provided, and the structure of the optic reflecting film system may refer to FIG. 1, wherein 1 refers to optic reflecting lens, 2 refers to conducting film, 3 refers to intermediate insulation layer, 4 refers to aluminum film, 5 refers to outermost medium protection layer, and 6 refers to conducting electrode.

The preparation method of the optic reflecting film system (i.e., frost-prevention reflecting film system) with the frost-prevention function is specifically as follows:

(1) a preparation step of: cleaning a vacuum chamber, a baffle, a clamp and so on, respectively adding indium tin oxide, silicon dioxide, aluminum and copper film materials into a crucible, wiping an optic reflecting lens by a degrease cloth dipped with a mixed solvent of absolute ethyl alcohol and diethyl ether, wiping the lens cleanly, placing the lens into the clamp and then putting the lens into the vacuum chamber;

(2) a step of vacuumizing and raising the temperature of the optic reflecting lens: starting up a vacuum pump to vacuumize and gradually raise the temperature to 180° C., wherein the step of raising the temperature and the constant temperature time are determined according to the size and shape of the optic lens; and (3) a step of plating films in vacuum: wherein the step of plating films comprises the following sub-steps:

A. a step of plating the conducting film: after keeping constant under a baking temperature of 180° C. for 3 h, evaporating the conducting film material, wherein the technical condition is that: the conducting film material is indium tin oxide (the mass ratio is 90% $In_2O_3$ and 10% $S_nO_2$), the vacuum degree is superior to 6×10-4 Pa, the monitoring thickness of the film layer is 180 nm, 40 SCCM oxygen is inflated in a Hall ion source, the anode voltage of the ion source is 180V, and the anode current is 6 A;

B. a step of plating an insulation layer and a reflecting film: wherein the plating material of the intermediate insulation layer is silicon dioxide, the vacuum degree is superior to $6×10^{-4}$ Pa, the monitoring thickness of the film layer is 200 nm, 40 SCCM oxygen is inflated in the Hall ion source, the anode voltage of the ion source is 180V, and the anode current is 6 A; and the plating material of the reflecting film is aluminum, the vacuum degree is superior to $6×10^{-4}$ Pa, the monitoring thickness of the film layer is 100 nm, a silicon dioxide protection layer is plated after the aluminum film is finished, the vacuum degree is superior to $6×10^{-4}$ Pa, the monitoring thickness of the film layer is 180 nm, 40 SCCM oxygen is inflated in a Hall ion source, the anode voltage of the ion source is 180V, and the anode current is 6 A; and C. a step of plating conductive electrodes: wherein the conducting electrodes are made of copper, the vacuum degree is superior to $6×10^4$ Pa, and the monitoring thickness of the film layer is 300 nm.

After the plating is finished, air needs to be inflated into the vacuum chamber after the reflector elements are completely cooled, and then the door of the vacuum chamber is opened to take out the plated optic reflecting lens.

FIG. 2-a is a spectral reflection curve of the prepared frost-prevention aluminum reflector; the spectral reflection efficiency information of the frost-prevention aluminum reflector can be seen from the figure, i.e., the average value of the spectral reflection rate of the frost-prevention aluminum reflector is superior to 89% in the band scope ranging from 400 nm to 2000 nm.

An effect test is conducted on a spherical experimental telescope plated with the frost-prevention reflecting film system.

The calibre of the spherical experimental telescope is Φ520 mm, the precision of the surface shape measured by a 4D interferometer is as follows: PV (peak-valley value)= 0.11724λ, and RMS (root-mean-square value)=0.0155λ, wherein λ is a wave length detected, which is 632.8 nm.

Different heating powers (20 W and 30 W) are respectively implemented on the frost-prevention reflector: and the change conditions of the surface shape under different heating power conditions are measured by the 4D interferometer, wherein the results are as follows:

(1) the heating power is 20 W, after keeping the heating power for 3 h, the surface shape of the spherical telescope is measured by the 4D interferometer, and the result shows that:

the precision is as follows: PV (peak-valley value)= 0.18132λ, and RMS (root-mean-square value)=0.02222λ;

(2) the heating power is 30 W, after keeping the heating power for 3 h, the surface shape of the spherical telescope is measured by the 4D interferometer, and the result shows that:

the precision is as follows: PV (peak-valley value)= 0.24878λ, and RMS (root-mean-square value)=0.0289λ.

It can be known from the frosting condition and the temperature rise condition of the telescope mirror surface that: the frost-prevention power required by the Φ520 mm spherical experimental telescope is about 20 W; and when the heating power is 30 W, the spherical experimental telescope may still keep a better surface shape precision.

Figure 4:
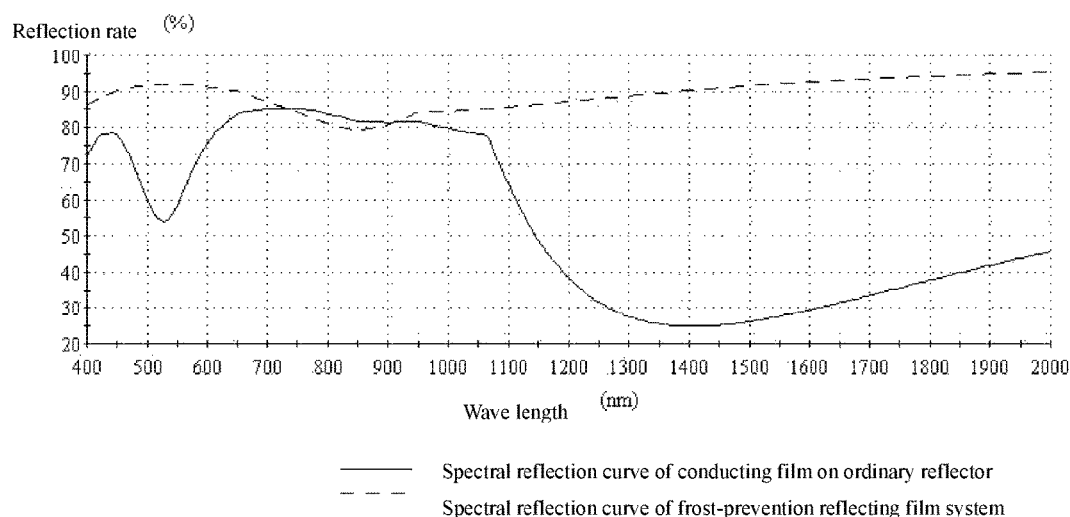
FIG. 4 is comparison between the frost-prevention reflecting film system and a spectral reflection curve of using a conducting film on an external surface of an ordinary aluminum telescope.

FIG. 4 is comparison between the frost-prevention reflecting film system and a spectral reflection curve of using a conducting film on an external surface of an ordinary aluminum telescope.

In conclusion, the surface shape precision of the optic frost-prevention reflector obtained in the embodiment is not affected or is rarely affected on the premise of having the frost-prevention function Embodiment 2

In the embodiment, the structure of the optic frost-prevention reflector proposed is the same as that in embodiment 1, but the difference is that Ag is used as the material of the reflecting layer, which has higher reflecting efficiency in the visible light and reflection efficiency band. In the same way, the structure of the frost-prevention reflecting film system is rationally designed, hereby guaranteeing the spectral reflection performance of the Ag film system while having the function of frost-prevention. The plating process of the frost-prevention reflecting film system comprises: plating a conducting film, plating an insulation layer and an Ag reflecting film system, and plating electrodes. The structure of the frost-prevention reflecting film system may refer to FIG. 1-b, wherein 1 refers to optic reflecting lens, 2 refers to conducting film, 3 refers to intermediate insulation layer, 4 refers to connection layer, 5 refers to Ag film system, and 6 refers to conducting electrode.

The preparation method of the Ag reflecting film system with the frost-prevention function is specifically as follows:

(1) cleaning a vacuum chamber, a baffle, a clamp and so on, respectively adding indium tin oxide, silicon dioxide, Ag, aluminium oxide, and tantalum pentoxide film materials, wiping an optic reflecting lens by a degrease cloth dipped with a mixed solvent of absolute ethyl alcohol and diethyl ether, wiping the lens cleanly, placing the lens into the clamp and then putting the lens into the vacuum chamber;

(2) a step of vacuumizing and raising the temperature of the optic reflecting lens: starting up a vacuum pump to vacuumize and gradually raise the temperature to 180° C., wherein the step of raising the temperature and the constant temperature time are determined according to the size and shape of the optic lens; and (3) a step of plating films in vacuum: wherein the step of plating films comprises the following sub-steps:

A. a step of plating the conducting film: after keeping constant under a baking temperature of 180° C. for 3 h, evaporating the conducting film material, wherein the technical condition is that: the conducting film material is indium tin oxide (the mass ratio is 90% $In_2O_3$ and 10% $S_nO_2$), the vacuum degree is superior to 6×10−4 Pa, the monitoring thickness of the film layer is 180 nm, 40 SCCM oxygen is inflated in a Hall ion source, the anode voltage of the ion source is 180V, and the anode current is 6 A;

B. a step of plating an insulation layer and a reflecting film: wherein the plating material of the intermediate insulation layer is silicon dioxide, the vacuum degree is superior to $6 \times 10^{-4}$ Pa, the monitoring thickness of the film layer is 200 nm, 40 SCCM oxygen is inflated in the Hall ion source, the anode voltage of the ion source is 180V, and the anode current is 6 A;

C. the step of plating the Ag reflecting film: the connection layer is made of aluminium oxide, the vacuum degree is superior to $6 \times 10^{-4}$ Pa, the thickness of the connection layer is 10 nm, then the Ag film is plated, the vacuum degree is superior to $6 \times 10^{-4}$ Pa, the evaporation speed rate is higher than 10 nm/s, the protection layer composed of silicon dioxide and tantalum pentoxide is plated after completion, the vacuum degree is superior to $6 \times 10^{-4}$ Pa, the monitoring thickness of the film layer is determined by the design of the film system, 40 SCCM oxygen is inflated in the Hall ion source, the anode voltage of the ion source is 180V, and the anode current is 6 A; and D. a step of plating conductive electrodes: wherein the conducting electrodes are made of copper, the vacuum degree is superior to $6 \times 10^{-4}$ Pa, and the monitoring thickness of the film layer is 300 nm.

After the plating is finished, air needs to be inflated into the vacuum chamber after the Ag reflector elements are completely cooled, then the door of the vacuum chamber is opened to take out the plated optic reflecting lens.

FIG. 2-b is a spectral reflection curve of the frost-prevention Ag reflecting film system prepared in the embodiment; the spectral reflection efficiency information of the frost-prevention Ag reflecting film system can be seen from the figure, i.e., the average value of the spectral reflection rate of the frost-prevention Ag reflector is superior to 98% in the band scope ranging from 400 nm to 2000 nm.

The invention claimed is:

1. A frost-prevention film system of a large-aperture reflecting optic infrared telescope used in an extremely low temperature environment, wherein a transparent conducting film is integrated on a reflector surface of the reflecting optic telescope, and the structure of the transparent conducting film is as follows: a transparent conducting film layer, an intermediate insulation layer, a reflecting film layer and an outermost medium protection layer in sequence from a main telescope surface; and both sides of the transparent conducting film layer are provided with conducting electrodes.

2. The frost-prevention film system of a large-aperture reflecting optic infrared telescope used in an extremely low temperature environment according to claim 1, wherein indium tin oxide is used in the transparent conducting film layer; silicon dioxide is used in the intermediate insulation layer; aluminum or argentum is used in the reflecting film layer; silicon dioxide, tantalum pentoxide and other dielectric oxides are used in the outermost medium protection layer; and the conducting electrodes are made of copper.

3. The frost-prevention film system of a large-aperture reflecting optic infrared telescope used in an extremely low temperature environment according to claim 1, wherein the transparent conducting film layer thickness is 180 nm; the intermediate insulation layer thickness is 200 nm; the reflecting film layer thickness is 100 nm; the outermost medium protection layer is a single layer or in a structure of collocation by film layers with high and low refractive indexes; and a film layer of the conducting electrodes is 300 nm.

4. A preparation method of the frost-prevention film system of a large-aperture reflecting optic infrared telescope used in an extremely low temperature environment according to claim 1, comprising:

(1) preparing by
(1)-1 cleaning all related parts in a vacuum chamber;
(1)-2 adding related film materials;
(1)-3 placing in an optic reflecting lens to be plated; and
(1)-4 vacuumizing the vacuum chamber;

(2) plating the conducting film by evaporating conducting film material after baking, wherein the conducting film material is indium tin oxide and monitoring thickness is 180 nm;

(3) plating the intermediate insulation layer, wherein the plating material of the intermediate insulation layer is silicon dioxide, and monitoring thickness is 200 nm;

(4) plating a reflecting film layer, wherein the plating material of the reflecting film layer is aluminum or argentum, and monitoring thickness is 100 nm;

(5) plating the outermost medium protection layer, wherein the plating material of the outermost medium protection layer is silicon dioxide, or silicon dioxide and tantalum pentoxide, and the outermost medium protection layer is a single layer or is collocated by film layers with high and low refractive indexes;

(6) plating the conducting electrodes, wherein the conducting electrodes are made of copper, and monitoring thickness is is 300 nm.

5. The preparation method of the frost-prevention film system of a large-aperture reflecting optic infrared telescope used in an extremely low temperature environment according to claim 4, wherein the adding related film materials in step (1)-2 in the preparing step refers to respectively adding indium tin oxide, silicon dioxide, aluminum and copper film materials into an oxygen-free copper crucible; and vacuumizing the vacuum chamber in the step (1)-4 is superior to $6 \times 10^{-4}$ Pa.

6. The preparation method of the frost-prevention film system of a large-aperture reflecting optic infrared telescope used in an extremely low temperature environment according to claim 4, wherein technical conditions of the steps (2) to (6) are respectively as follows:

(2) the step of plating the conducting film further includes after keeping constant under a baking temperature of 180° C. for 3 h, evaporating the conducting film material, wherein the conducting film material is indium tin oxide, the indium tin oxide comprises 90% $In_2O_3$ and 10% $SnO_2$ by mass percent, a vacuum degree is superior to $6\times10^{-4}$ Pa, 40 SCCM oxygen is inflated in a Hall ion source, an anode voltage of an ion source is 180V, and an anode current is 6 A;

(3) the step of plating the intermediate insulation layer, wherein the plating material of the intermediate insulation layer is silicon dioxide, a vacuum degree is superior to $6\times10^{-4}$ Pa, 40 SCCM oxygen is inflated in the Hall ion source, the anode voltage of the ion source is 180V, and the anode current is 6 A;

(4) the step of plating the reflecting film, wherein the plating material of the reflecting film is aluminum or argentum, and the vacuum degree is superior to $6\times10^{-4}$ Pa;

(5) the step of plating the outermost medium protection layer, wherein the material of the outermost medium protection layer is silicon dioxide, or silicon dioxide and tantalum pentoxide, the vacuum degree is superior to $6\times10^{-4}$ Pa, 40 SCCM oxygen is inflated in the Hall ion source, the anode voltage of the ion source is 180V, and the anode current is 6 A; and (6) the step of plating the conducting electrodes, the conducting electrodes are made of copper, and the vacuum degree is superior to $6\times10^{-4}$ Pa.

* * * * *